US010318832B2

(12) United States Patent
Shin et al.

(10) Patent No.: US 10,318,832 B2
(45) Date of Patent: Jun. 11, 2019

(54) METHOD AND APPARATUS FOR AUTHENTICATING USER USING VEIN PATTERN

(71) Applicant: SAMSUNG ELECTRONICS CO., LTD., Suwon-si (KR)

(72) Inventors: Jungsoon Shin, Yongin-si (KR); Namjoon Kim, Anyang-si (KR); Joonah Park, Seoul (KR); Soochul Lim, Seoul (KR); Jaehyuk Choi, Seoul (KR); Tae-Sung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 738 days.

(21) Appl. No.: 14/725,460

(22) Filed: May 29, 2015

(65) Prior Publication Data

US 2016/0117563 A1     Apr. 28, 2016

(30) Foreign Application Priority Data

Oct. 23, 2014   (KR) .................. 10-2014-0144117

(51) Int. Cl.
  *G06K 9/00* (2006.01)
  *G06F 21/32* (2013.01)
(52) U.S. Cl.
  CPC ......... *G06K 9/00885* (2013.01); *G06F 21/32* (2013.01); *G06K 2009/00932* (2013.01); *G06K 2009/00939* (2013.01)

(58) Field of Classification Search
  CPC ..... G06K 9/00885; G06K 2009/00939; G06K 2009/00932; G06F 21/32
  See application file for complete search history.

(56) References Cited

U.S. PATENT DOCUMENTS

| 5,508,759 | A | * | 4/1996 | Konishi | ................. | A61B 3/113 351/205 |
|---|---|---|---|---|---|---|
| 8,019,126 | B2 | | 9/2011 | Amano | | |
| 8,300,897 | B2 | | 10/2012 | Nagasaka et al. | | |
| 8,335,353 | B2 | | 12/2012 | Yamamoto et al. | | |
| 8,384,885 | B2 | | 2/2013 | Kono et al. | | |
| 8,477,012 | B2 | | 7/2013 | Kato | | |
| 8,565,497 | B2 | | 10/2013 | Nada et al. | | |
| 8,588,478 | B2 | | 11/2013 | Makimoto et al. | | |
| 8,607,064 | B2 | | 12/2013 | Uneda et al. | | |
| 8,649,568 | B2 | | 2/2014 | Sato | | |

(Continued)

FOREIGN PATENT DOCUMENTS

| JP | 2002-312324 A | 10/2002 |
|---|---|---|
| JP | 4900578 B2 | 3/2012 |

(Continued)

*Primary Examiner* — Chan S Park
*Assistant Examiner* — Elisa M Rice
(74) *Attorney, Agent, or Firm* — NSIP Law

(57) ABSTRACT

A method and apparatus for authenticating a user using a vein pattern are provided that project a near infrared (NIR) ray toward a skin of the user using a light emitting diode (LED), where the user is adjacent to a terminal including the LED. An image sensor receives a light reflected by the skin, generates a vein pattern of the skin based on an image generated using the received light, and authenticates the user as a registered user of a pre-stored vein pattern when the generated vein pattern matches the pre-stored vein pattern.

38 Claims, 17 Drawing Sheets

(56) References Cited

U.S. PATENT DOCUMENTS

| | | | |
|---|---|---|---|
| 8,666,121 B2 | 3/2014 | Muquit et al. | |
| 8,692,875 B2 | 4/2014 | Watanabe | |
| 8,768,049 B2 | 7/2014 | Wang et al. | |
| 8,787,624 B2 | 7/2014 | Hama et al. | |
| 9,621,562 B2 * | 4/2017 | Furuichi | H04L 63/08 |
| 2002/0061748 A1 * | 5/2002 | Nakakita | H04L 63/08 |
| | | | 455/435.1 |
| 2004/0022421 A1 * | 2/2004 | Endoh | G06F 3/021 |
| | | | 382/115 |
| 2005/0180620 A1 | 8/2005 | Takiguchi | |
| 2007/0223792 A1 * | 9/2007 | Morimoto | G06K 9/00033 |
| | | | 382/126 |
| 2008/0216171 A1 | 9/2008 | Sano et al. | |
| 2008/0273762 A1 * | 11/2008 | Kato | G06K 9/00 |
| | | | 382/115 |
| 2009/0080710 A1 * | 3/2009 | Abe | G07C 9/00087 |
| | | | 382/115 |
| 2009/0115617 A1 * | 5/2009 | Sano | G06F 17/30241 |
| | | | 340/573.1 |
| 2009/0185241 A1 * | 7/2009 | Nepomniachtchi | G06K 9/36 |
| | | | 358/474 |
| 2010/0061598 A1 * | 3/2010 | Seo | A61B 5/0059 |
| | | | 382/115 |
| 2011/0063077 A1 | 3/2011 | Jung et al. | |
| 2012/0046077 A1 * | 2/2012 | Kim | H04M 1/72577 |
| | | | 455/566 |
| 2012/0271172 A1 * | 10/2012 | Komuro | A61B 8/06 |
| | | | 600/441 |
| 2014/0196131 A1 * | 7/2014 | Lee | G06F 21/35 |
| | | | 726/7 |
| 2014/0201827 A1 * | 7/2014 | Okazaki | G06F 1/1616 |
| | | | 726/7 |
| 2014/0221848 A1 * | 8/2014 | Nagasaka | A61B 5/721 |
| | | | 600/479 |

FOREIGN PATENT DOCUMENTS

| | | | |
|---|---|---|---|
| JP | 4953235 B2 | 6/2012 | |
| JP | 5268293 B2 | 8/2013 | |
| JP | 2013-212315 A | 10/2013 | |
| JP | 2014-124453 A | 7/2014 | |
| KR | 10-2010-0091592 A | 8/2010 | |
| KR | 10-1067198 B1 | 9/2011 | |

* cited by examiner

METHOD AND APPARATUS FOR AUTHENTICATING USER USING VEIN PATTERN

CROSS-REFERENCE TO RELATED APPLICATION(S)

This application claims the benefit under 35 USC 119(a) of Korean Patent Application No. 10-2014-0144117 filed on Oct. 23, 2014, in the Korean Intellectual Property Office, the entire disclosure of which is incorporated herein by reference for all purposes.

BACKGROUND

1. Field

The following description relates to a method and apparatus for authenticating a user of a terminal. The following description also relates to a method and apparatus for authenticating a user using a vein pattern of the user.

2. Description of Related Art

Research on various security methods of protecting personal information is underway. To authenticate a user, a method of inputting a preset identification (ID) and a preset password may be used. However, such a knowledge-based authentication may be vulnerable to information exposure, in that the ID and password may be acquired and used to permit unauthorized access. Thus, a method of authenticating a user using biometric data of the user may be used, rather than the knowledge-based authentication. The biometric data may include, for example, a fingerprint pattern, an iris pattern, and a vein pattern.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of authenticating a user using a vein pattern includes projecting a near infrared (NIR) ray toward a skin of the user, using a light emitting diode (LED), wherein the user is adjacent to a terminal including the LED, receiving a light reflected by the skin using an image sensor, generating a vein pattern of the skin based on an image generated using the received light, and authenticating the user as a registered user corresponding to a pre-stored vein pattern when the generated vein pattern matches the pre-stored vein pattern.

The method may further include verifying whether the generated vein pattern matches the pre-stored vein pattern.

The terminal may be a wearable device.

The wearable device may be a watch type device.

The method may further include unlocking the terminal in response to the user being authenticated as the registered user.

The method may further include unlocking a device interoperating with the terminal in response to the user being authenticated as the registered user.

The method may further include switching an operating mode of the terminal to an authentication mode, and increasing outputs of the LED and the image sensor to preset outputs in response to the operating mode being switched to the authentication mode.

The method may further include verifying whether the skin is positioned within a preset distance from the terminal, wherein the switching is performed in response to the skin being positioned within the preset distance from the terminal.

The method may further include detecting a pulse wave of a vein of the skin using the received light, and verifying whether the detected pulse wave matches a pre-stored pulse wave, wherein the authenticating includes authenticating the user as the registered user in response to the generated vein pattern matching the pre-stored vein pattern and in response to the detected pulse wave matching the pre-stored pulse wave.

The detecting may include detecting the pulse wave using an image amplifier.

The image sensor may include one of a complementary metal-oxide semiconductor (CMOS) image sensor (CIS), a charge coupled device (CCD), a laser speckle sensor, and a sensor using indium-gallium-sulfur (InGaS).

The method may further include registering the registered user at the terminal.

The registering may include projecting an NIR ray toward a skin of the registered user adjacent to the terminal, using the LED, receiving a light reflected by the skin of the registered user using the image sensor, generating a vein pattern of the skin of the registered user based on an image generated using the received light, and registering the registered user at the terminal by storing the vein pattern.

The method may further include verifying whether the image exhibits a vein pattern, wherein the generating is performed in response to the image exhibiting a vein pattern.

The authenticating may include correcting the image to verify whether the generated vein pattern matches the pre-stored vein pattern.

The correcting may include grayscaling the image, and correcting at least one of a scale, a point of view, and an orientation of the grayscaled image.

The method may further include verifying whether the terminal is worn by the user when the terminal is a wearable device, wherein the projecting is performed in response to the terminal being worn by the user.

The method may further include verifying whether the terminal is removed, and switching an operating mode of the terminal to a locking mode in response to the terminal being removed.

The method may further include transmitting information corresponding to the registered user to a device interoperating with the terminal when the user is authenticated as the registered user.

In another general aspect, a terminal includes a near infrared (NIR) ray projector configured to project an NIR ray toward a skin of a user of the terminal using a light emitting diode (LED), wherein the user is adjacent to the terminal including the LED, a light receiver configured to receive a light reflected by the skin using an image sensor, a vein pattern generator configured to generate a vein pattern of the skin based on an image generated using the received light, and an authenticator configured to authenticate the user as a registered user corresponding to a pre-stored vein pattern when the generated vein pattern matches the pre-stored vein pattern.

In another general aspect, a method of authenticating a user using a vein pattern performed by a terminal includes detecting a touch of a user, projecting a near infrared (NIR) ray toward a touched skin of the user using a light emitting diode (LED), receiving a light reflected by the skin using an image sensor, generating a vein pattern of the skin based on an image generated using the received light, and authenticating the user as a registered user corresponding to a pre-stored vein pattern when the generated vein pattern matches the pre-stored vein pattern.

The method may further include verifying whether the generated vein pattern matches the pre-stored vein pattern.

The terminal may be a wearable device.

The wearable device may be a watch type device.

The method may further include unlocking the terminal in response to the user being authenticated as the registered user.

The method may further include unlocking a device interoperating with the terminal in response to the user being authenticated as the registered user.

The method may further include switching an operating mode of the terminal to an authentication mode, and increasing outputs of the LED and the image sensor to preset outputs in response to the operating mode being switched to the authentication mode.

The method may further include detecting a pulse wave of a vein of the skin using the received light, and verifying whether the detected pulse wave matches a pre-stored pulse wave, wherein the authenticating includes authenticating the user as the registered user in response to the generated vein pattern matching the pre-stored vein pattern and in response to the detected pulse wave matching the pre-stored pulse wave.

The detecting may include detecting the pulse wave using an image amplifier.

The image sensor may include one of a complementary metal-oxide semiconductor (CMOS) image sensor (CIS), a charge coupled device (CCD), a laser speckle sensor, and a sensor using indium-gallium-sulfur (InGaS).

The method may further include registering the registered user at the terminal.

The registering may include recognizing a touch of the registered user, projecting an NIR ray toward a touched skin of the registered user using the LED, receiving a light reflected by the skin of the registered user using the image sensor, generating a vein pattern of the skin of the registered user using the received light; and registering the registered user at the terminal by storing the vein pattern.

The method may further include verifying whether the image exhibits a vein pattern, wherein the generating is performed in response to the image exhibiting a vein pattern.

The authenticating may include correcting the image to verify whether the generated vein pattern matches the pre-stored vein pattern.

The correcting may include grayscaling the image, and correcting at least one of a scale, a point of view, and an orientation of the grayscaled image.

The method may further include verifying whether the terminal is worn by the user in response to the terminal being a wearable device, wherein the projecting is performed in response to the terminal being worn by the user.

The method may further include verifying whether the terminal is removed, and switching an operating mode of the terminal to a locking mode in response to the terminal being removed.

The method may further include transmitting information corresponding to the registered user to a device interoperating with the terminal when the user is authenticated as the registered user.

In another general aspect, a terminal includes a controller configured to recognize a touch of a user, a near infrared (NIR) ray projector configured to project an NIR ray toward a touched skin of the user using a light emitting diode (LED), a light receiver configured to receive a light reflected by the skin using an image sensor, a vein pattern generator configured to generate a vein pattern of the skin based on an image generated using the received light, and an authenticator configured to authenticate the user as a registered user corresponding to a pre-stored vein pattern when the generated vein pattern matches the pre-stored vein pattern.

In another general aspect, a method of authenticating a user using a vein pattern includes projecting a near infrared (NIR) ray toward a skin of the user, receiving a light reflected by the skin using an image sensor, generating a vein pattern of the skin based on an image generated using the received light, and authenticating the user as a registered user based on the generated vein pattern and a pre-stored vein pattern.

The authenticating may include authenticating the user as a registered user corresponding to the pre-stored vein pattern when the generated vein pattern matches the pre-stored vein pattern.

Other features and aspects will be apparent from the following detailed description, the drawings, and the claims.

Figure 1:
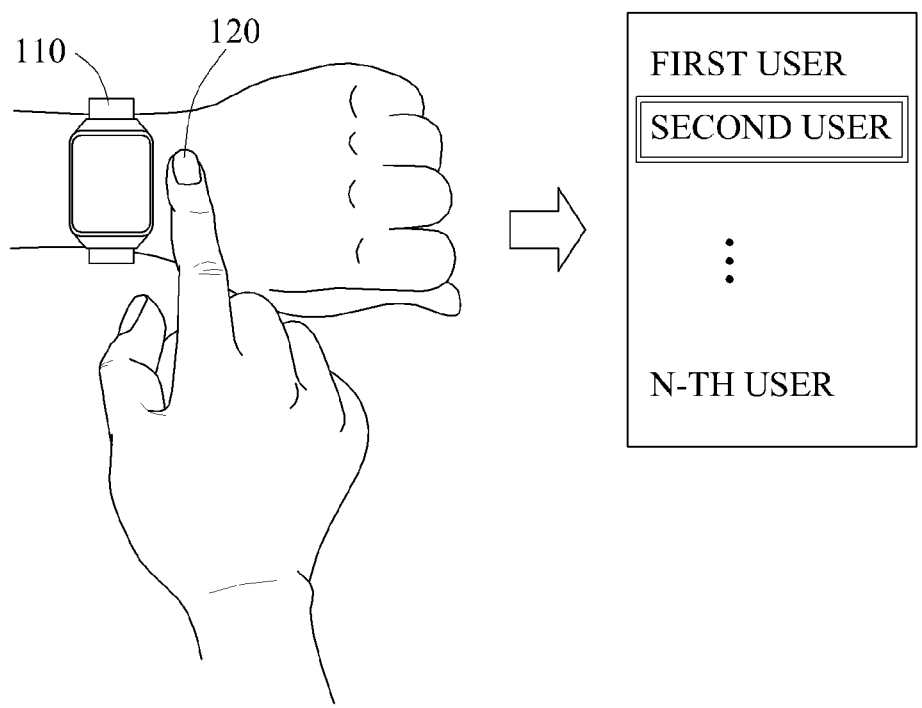
FIG. 1 illustrates an example of a user authenticated using a vein pattern.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference is now be made in further detail to examples with reference to the accompanying drawings, wherein like reference numerals refer to like elements throughout.

Various alterations and modifications are optionally made to the examples. Here, the examples are not construed as limited to the disclosure and are intended to be understood to include all changes, equivalents, and replacements within the idea and the technical scope of the disclosure and related concepts.

The terminology used herein is for the purpose of describing particular examples only and is not to be limiting of the examples. As used herein, the singular forms "a", "an", and "the" are intended to include the plural forms as well, unless the context clearly indicates otherwise. It is intended to be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It is intended to be further understood that terms, such as those defined in commonly-used dictionaries, are intended to be interpreted as having a meaning that is consistent with their meaning in the context of the relevant art and are not intended to be interpreted in an idealized or overly formal sense unless expressly so defined herein.

When describing the examples with reference to the accompanying drawings, like reference numerals refer to like constituent elements and a repeated description related thereto is omitted for brevity. When it is determined detailed description related to a related known function or configuration causes the purpose of the examples unnecessarily ambiguous in describing the examples, the detailed description is omitted for clarity.

FIG. 1 illustrates an example of a user authenticated using a vein pattern.

Referring to FIG. 1, a vein pattern authentication system 100 includes a terminal, and a skin 120 of a user. Hereinafter, the terminal is referred to as a portable terminal 110. Although the terminal is described in an example that operates using the portable terminal 110, a scope of the terminal is not limited to the portable terminal 110. That is, the terminal is potentially a non-portable terminal. With respect to the terminal, examples of a portable terminal are a smartwatch or smartphone, while an example of non-portable terminal is a desktop computer with an attached monitor and other peripherals.

A blood vessel of a human has a transmittance that differs from that of other tissue, such as skin or muscle, with respect to a wavelength of an infrared (IR) ray. Thus, when an IR ray is projected toward a skin surface of a human, such as a human's wrist, a light reflected by the skin is able to be received and measured and based on the measurements, a blood vessel is distinguished from other tissues based on the measured, received light. In an example, the blood vessel is a vein.

In an example, an IR ray used to generate a vein pattern is a near infrared (NIR) ray.

The portable terminal 110 generates a vein pattern of the skin 120 of the user. The portable terminal 110 authenticates a user corresponding to the generated vein pattern, among a plurality of registered users.

According to an example, by authenticating a user using a vein pattern, a security of the portable terminal 110 is enhanced. Additionally, by authenticating a user using a vein pattern, a security of a device interoperating or otherwise communicating with the portable terminal 110 is also enhanced.

Hereinafter, vein pattern authentication methods are described in further detail with reference to FIGS. 2 through 17.

Figure 2:
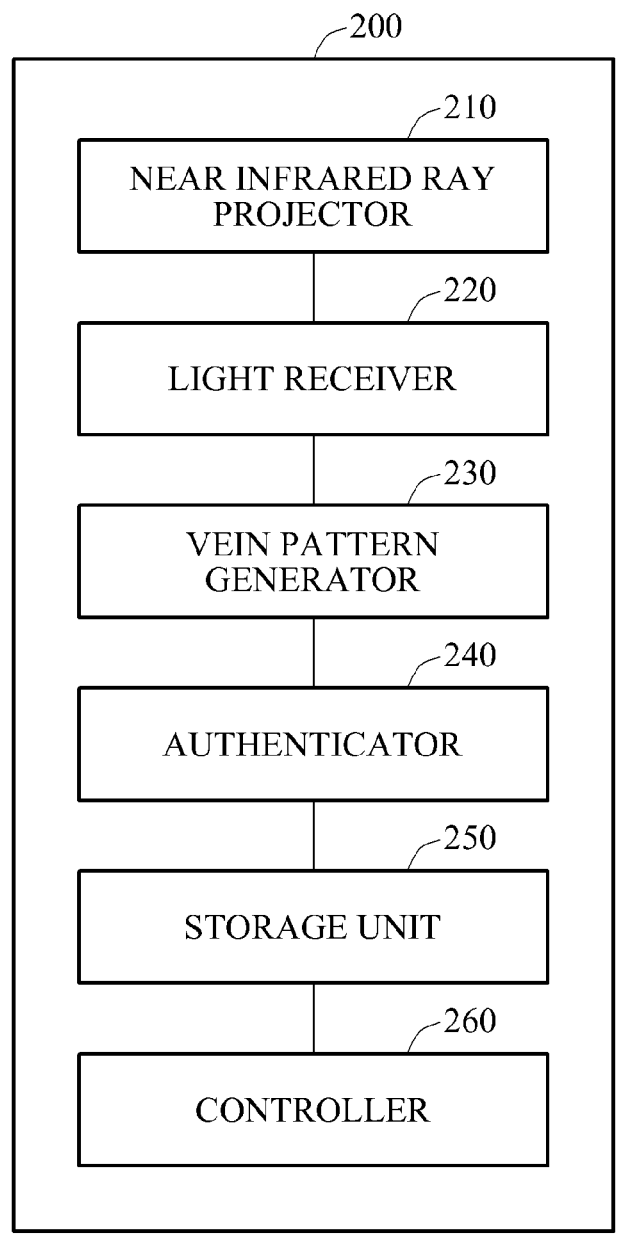
FIG. 2 is a block diagram illustrating an example of a portable terminal performing a vein pattern authentication.

FIG. 2 is a block diagram illustrating an example of a portable terminal 200 performing a vein pattern authentication.

In the example of FIG. 2, the portable terminal 200 is the portable terminal 110 of FIG. 1, as described in further detail, above.

According to an example, the portable terminal 200 is one of a smart phone, a laptop computer, and a tablet personal computer (PC). However, these are only examples, and other computing devices are used as the portable terminal 200 in other examples.

According to another example, the portable terminal 200 is a wearable device. For example, in such an example the wearable device is one of a watch type device, a ring type device, a bracelet type device, a necklace type device, and a glasses type device. However, these are only examples, and other wearable computing devices are used as the portable terminal 200 in other examples.

Referring to the example of FIG. 2, the portable terminal 200 includes an NIR ray projector 210, a light receiver 220, a vein pattern generator 230, an authenticator 240, a storage unit 250, and a controller 260. However, other relevant components are used in addition to or in lieu of these example components in other examples.

In the example of FIG. 2, the controller 260 controls the NIR ray projector 210, the light receiver 220, the vein pattern generator 230, the authenticator 240, and the storage unit 250.

In such an example, the NIR ray projector 210, the light receiver 220, the vein pattern generator 230, the authenticator 240, the storage unit 250, and the controller 260 are described in further detail with reference to FIGS. 3 through 17, as discussed below.

Figure 3:
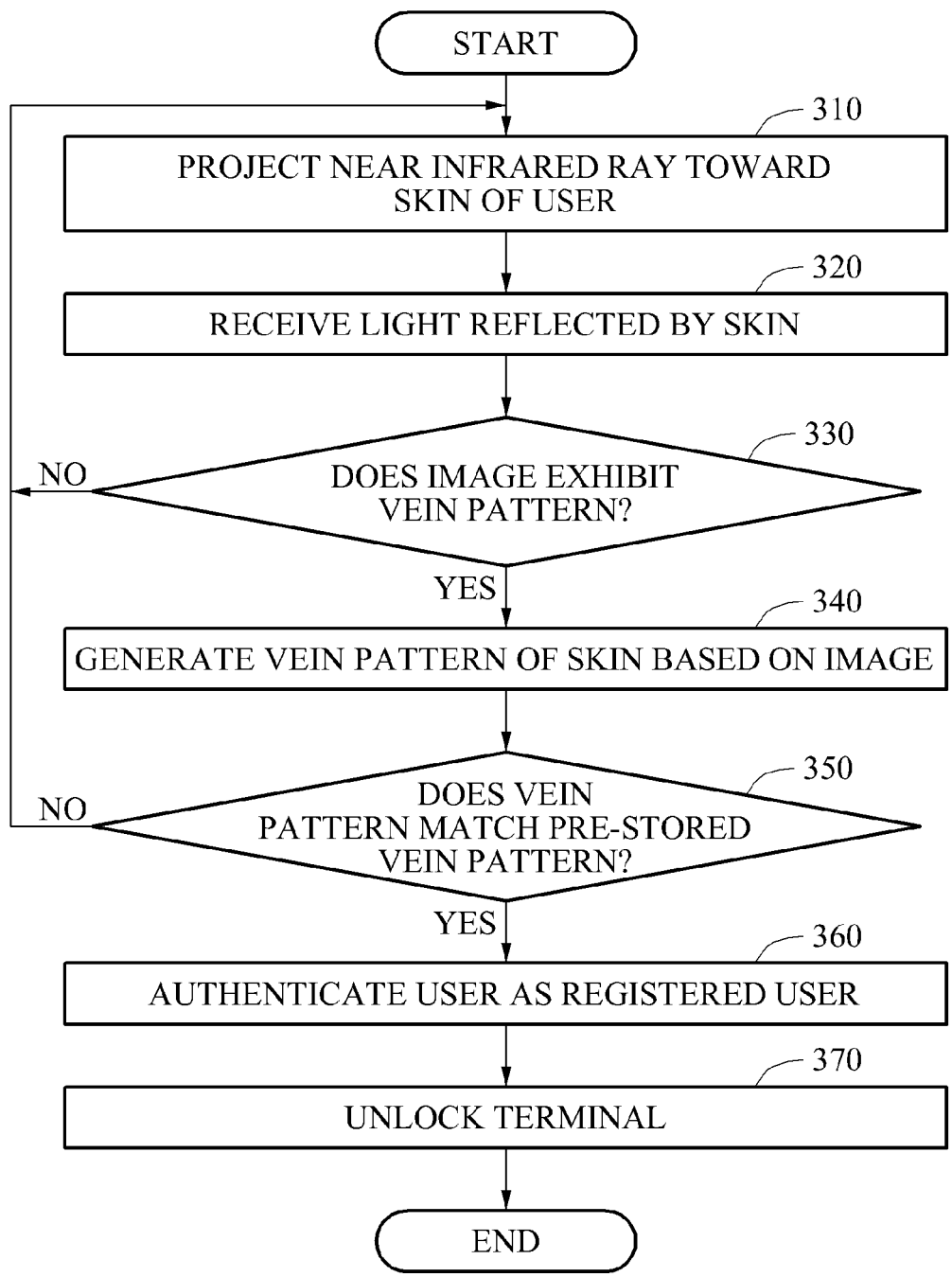
FIG. 3 is a flowchart illustrating an example of a vein pattern authentication method.

FIG. 3 is a flowchart illustrating an example of a vein pattern authentication method. The vein pattern authentication method of FIG. 3 is performed by the portable terminal 200 of FIG. 2.

Referring to FIG. 3, in operation 310, the method projects a near infrared ray toward the skin of a user. For example, the NIR ray projector 210 projects an NIR ray toward a skin, of a user of the portable terminal 200, adjacent to the portable terminal 200 using a light emitting diode (LED). In an example, the LED is an NIR LED configured to emit an NIR ray. As discussed, such an NIR ray can be used to identify vein patterns for particular users.

In operation 320, the method receives light reflected by the skin of the user. For example, the light receiver 220 receives a light reflected by the skin using an image sensor.

For example, in various examples, the image sensor includes one of a complementary metal-oxide semiconductor (CMOS) image sensor (CIS), a charge coupled device (CCD), a laser speckle sensor, and a sensor using indium-gallium-sulfur (InGaS). Such image sensors receive and measure the light, such as NIR light, that is produced by the LED and reflected by the skin of the user.

According to an example, the image sensor is an array sensor.

According to another example, the image sensor may have pixels designed to respond to an NIR ray reflected by a skin tissue or a blood vessel.

According to still another example, the image sensor includes an IR band pass optical filter on a surface of the sensor or above the pixels, where the filter is configured to allow only a band of an NIR ray to pass. Such an optical blocks other bands of light.

The light receiver 220 increases an integration time so as to be greater than a preset time when an output of the LED is determined to be relatively low.

The light receiver 220 generates an image using the received light.

Since a transmittance of a vein with respect to an NIR ray differs from a transmittance of a peripheral tissue that is not a vein, the vein of the skin is exhibited in the image, because the image will provide visual information that differentiates between a vein and other tissue.

In operation 330, the method verifies whether the image exhibits a vein pattern. For example, the vein pattern generator 230 verifies whether the image exhibits a vein pattern.

For example, the vein pattern generator 230 verifies whether the image exhibits a vein pattern based on stored data. Such stored data includes records that represent reference vein patterns that help identify past users. An algorithm that verifies whether an image exhibits a vein pattern is trained when the user feeds back information regarding a corresponding result.

When the image exhibits a vein pattern, operation 340 is performed. In operation 340, the method generates a vein pattern of the skin based on the image generated using the received light. For example, the vein pattern generator 230 generates a vein pattern of the skin based on the image generated using the received light.

In operation 350, the method verifies whether the generated vein pattern matches a pre-stored vein pattern. For example, the authenticator 240 verifies whether the generated vein pattern matches a pre-stored vein pattern.

According to an example, the storage unit 250 stores a plurality of vein patterns. The plurality of vein patterns are respective vein patterns of a plurality of registered users.

For example, the authenticator 240 verifies whether the generated vein pattern matches one of the plurality of pre-stored vein patterns.

In operation 360, the method authenticates the user as a registered user of the pre-stored vein pattern when the generated vein pattern matches the pre-stored vein pattern. For example, the authenticator 240 authenticates the user as a registered user of the pre-stored vein pattern when the generated vein pattern matches the pre-stored vein pattern.

According to an example, the authenticator 240 authenticates the user as the registered user of the pre-stored vein pattern when the generated vein pattern matches one of the plurality of pre-stored vein patterns.

In operation 370, the method unlocks the portable terminal 200 when the user is authenticated as the registered user. For example, the controller 260 unlocks the portable terminal 200 when the user is authenticated as the registered user.

For example, the controller 260 provides a menu set for the user to the portable terminal 200 when the user is authenticated as one of the plurality of registered users.

Figure 4:
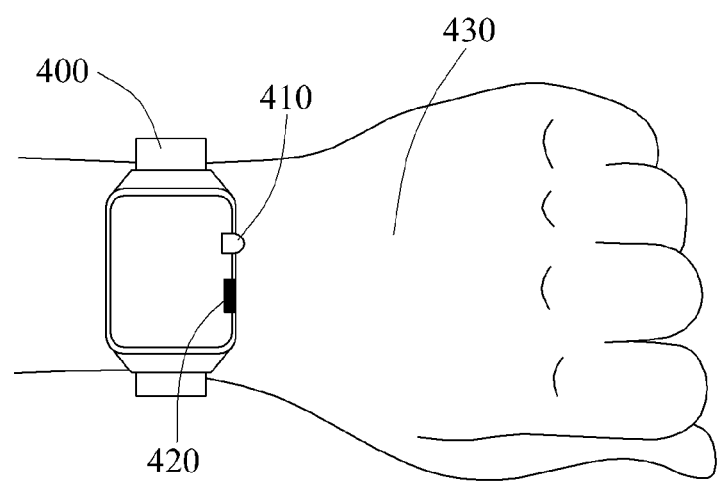
FIG. 4 illustrates an example of a method of projecting a near infrared (NIR) ray toward a skin of a user.

FIG. 4 illustrates an example of a method of projecting an NIR ray toward a skin of a user.

Referring to the example of FIG. 4, a portable terminal 400 includes an NIR ray projector 410, and a light receiver 420. In the example of FIG. 4, the portable terminal 400, the NIR ray projector 410, and the light receiver 420 correspond to the portable terminal 200, the NIR ray projector 210, and the light receiver 220 of FIG. 2, respectively. Hence, the corresponding previously presented descriptions of these elements also apply to these elements.

According to an example, a skin of a user corresponds to a back 430 of a hand of the user.

The NIR ray projector 410 projects an NIR ray toward the back 430 of the hand of the user.

The light receiver 420 receives a light reflected by the back 430 of the hand of the user.

Figure 5:
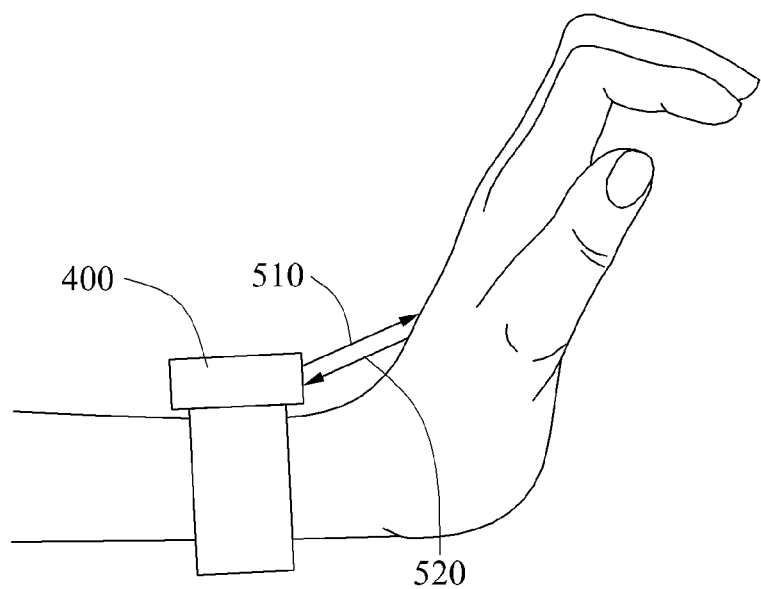
FIG. 5 illustrates an example of a method of projecting an NIR ray toward a skin of a user.

An example of projecting an NIR ray toward the back 430 of the hand of the user is further illustrated in FIG. 5.

FIG. 5 illustrates an example of a method of projecting an NIR ray toward a skin of a user.

Referring to the example of FIG. 5, the user disposes the back 430 of the hand on which the portable terminal 400 is worn within an angle of view of an LED of the NIR ray projector 410.

Hence, the NIR ray projector 410 projects an NIR ray 510 toward the back 430 of the hand.

Thus, the light receiver 420 receives a light 520 reflected by the back 430 of the hand.

Figure 6:
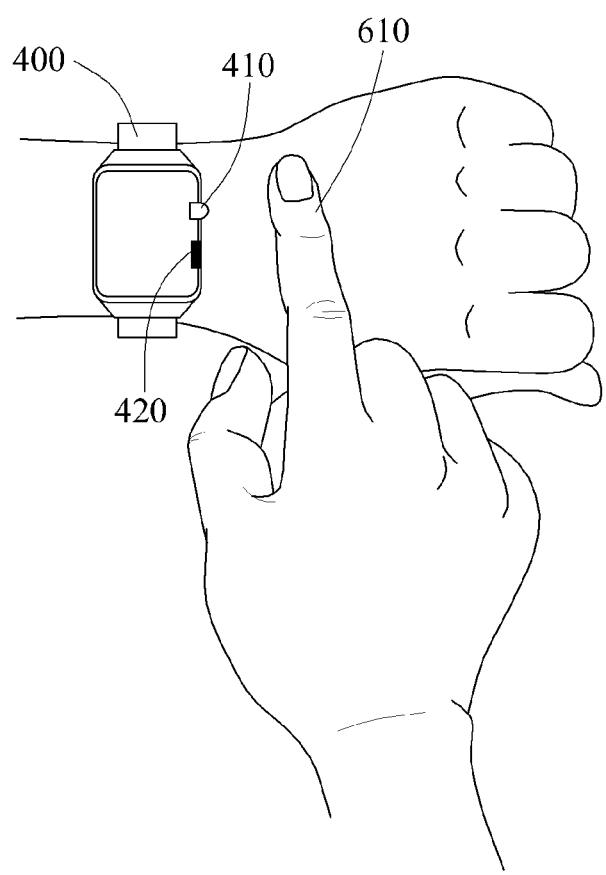
FIG. 6 illustrates an example of a method of projecting an NIR ray toward a skin of a user.

FIG. 6 illustrates an example of a method of projecting an NIR ray toward a skin of a user.

Referring to the example of FIG. 6, the user disposes at least one finger 610 of a hand other than the hand on which the portable terminal 400 is worn, within the angle of view of the LED of the NIR ray projector 410.

In such an example, the NIR ray projector 410 projects an NIR ray toward the at least one finger 610.

Thus, the light receiver 420 may receive a light reflected by the at least one finger 610.

Figure 7:
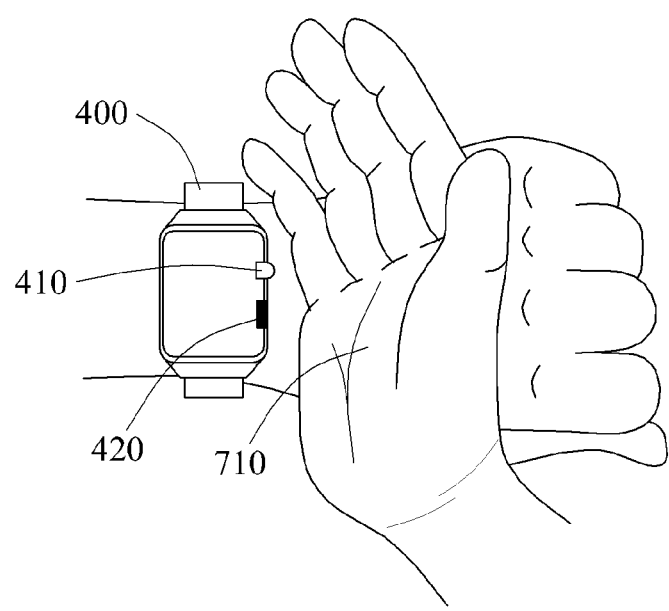
FIG. 7 illustrates an example of a method of projecting an NIR ray toward a skin of a user.

FIG. 7 illustrates an example of a method of projecting an NIR ray toward a skin of a user.

Referring to the example of FIG. 7, the user disposes a palm 710 of a hand other than the hand on which the portable terminal 400 is worn, within the angle of view of the LED of the NIR ray projector 410.

In this example, the NIR ray projector 410 projects an NIR ray toward the palm 710.

Thus, the light receiver 420 receives a light reflected by the palm 710.

Figure 8:
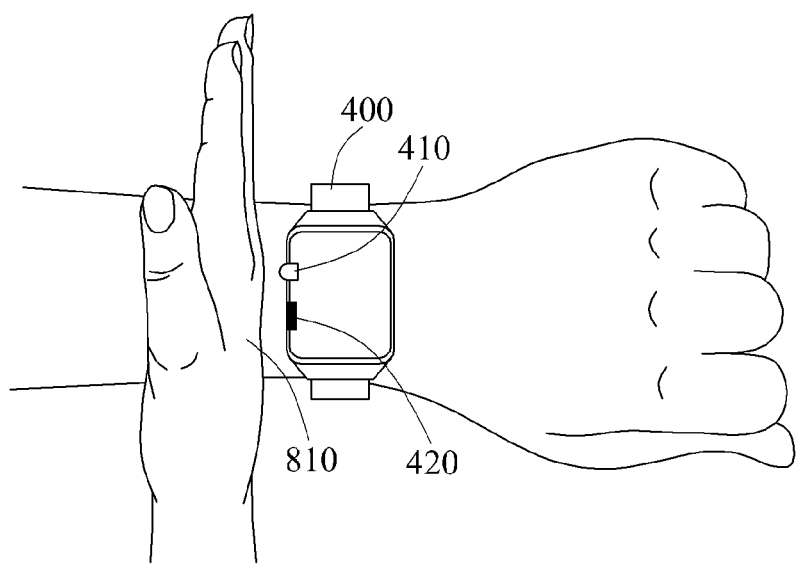
FIG. 8 illustrates an example of a method of projecting an NIR ray toward a skin of a user.

FIG. 8 illustrates an example of a method of projecting an NIR ray toward a skin of a user.

Referring to FIG. 8, the user disposes a back 810 of a hand other than the hand on which the portable terminal 400 is worn, within the angle of view of the LED of the NIR ray projector 410.

In this example, the NIR ray projector 410 projects an NIR ray toward the back 810 of the other hand.

The light receiver 420 receives a light reflected by the back 810 of the other hand.

According to an example, the portable terminal 400 changes positions of the NIR ray projector 410 and the light receiver 420 by deforming a body part of the portable terminal 400. For example, the user changes the positions of the NIR ray projector 410 and the light receiver 420 by rotating the body part of the portable terminal 400. Such adjustment helps ensure that the NIR ray is emitted and received in an appropriate direction.

FIGS. 4 through 8 illustrate various examples of the NIR ray projector 410 and the light receiver 420 that are positioned on a side surface of the portable terminal 400. However, according to an example, the NIR ray projector 410 and the light receiver 420 are alternatively positioned on a front surface of the portable terminal 400.

Figure 9:
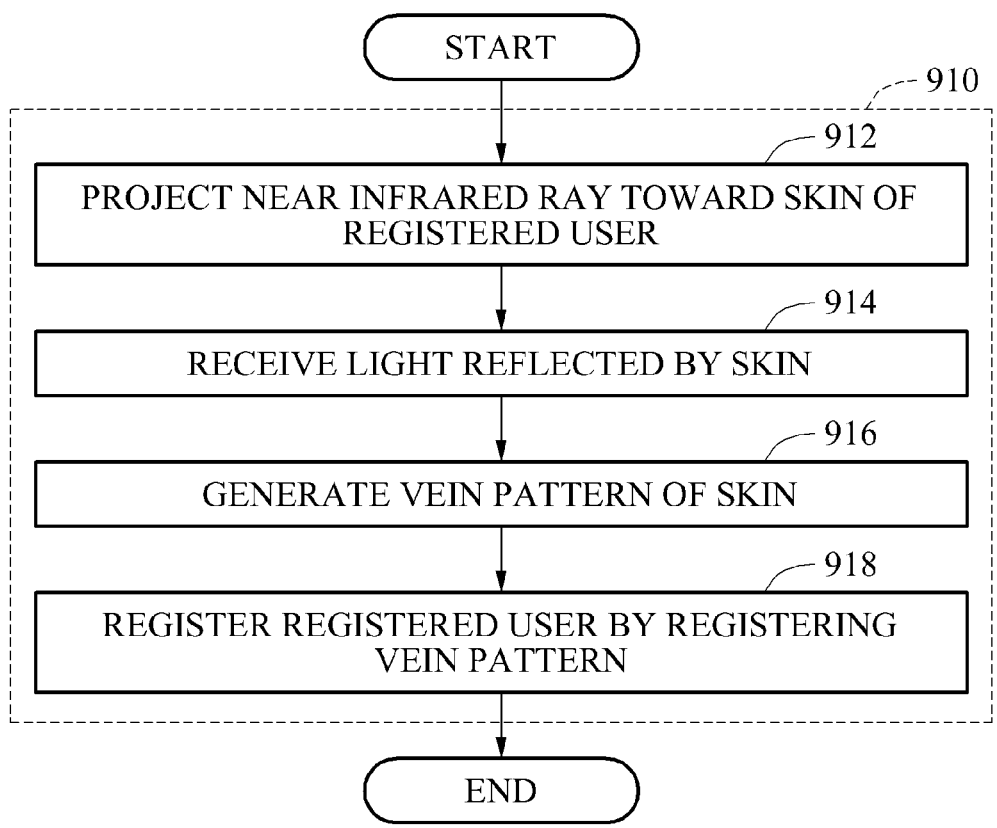
FIG. 9 is a flowchart illustrating an example of a method of registering a user.

FIG. 9 is a flowchart illustrating an example of a method of registering a user.

Operation 910 is optionally performed before operation 310 of FIG. 3 is performed.

Operation 910 is an operation of registering a user at the portable terminal 200 of FIG. 2.

Referring to FIG. 9, operation 910 includes operations 912 through 918.

In operation 912, the method projects a near infrared ray toward the skin of a registered user. For example, the NIR ray projector 210 projects an NIR ray toward a skin of a user adjacent to the portable terminal 200 using an LED.

In operation 914, the method receives light reflected by the skin. For example, the light receiver 220 receives a light reflected by the skin using an image sensor.

In operation 916, the method generates a vein pattern of the skin. For example, the vein pattern generator 230 generates a vein pattern of the skin based on an image generated using the received light.

In operation 918, the method registers a user by registering the vein pattern. For example, the authenticator 240 registers the user at the portable terminal 200 by storing the generated vein pattern of the user.

For example, the authenticator 240 encrypts the vein pattern of the user and stores the encrypted vein pattern in the storage unit 250.

Figure 10:
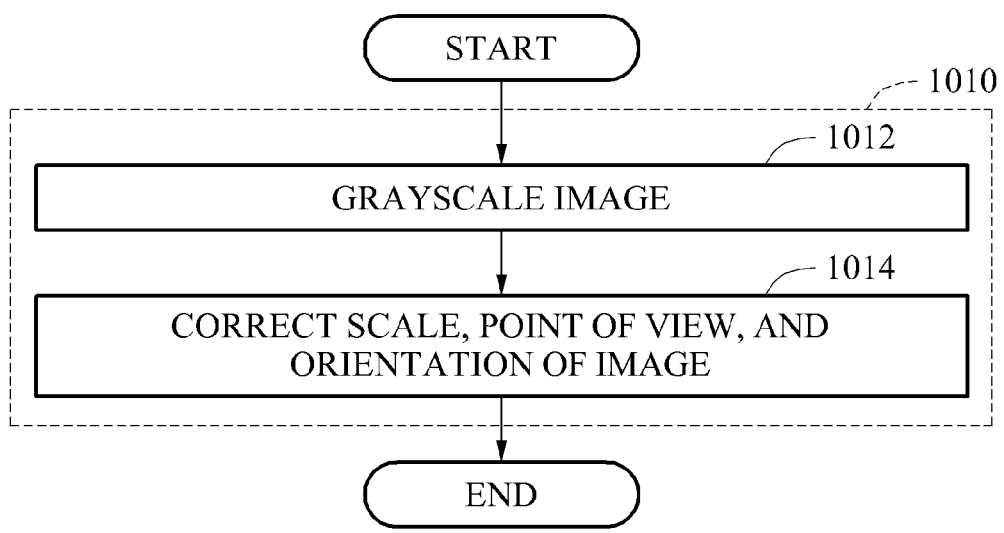
FIG. 10 is a flowchart illustrating an example of a method of correcting an image.

FIG. 10 is a flowchart illustrating an example of a method of correcting an image.

Operation 360 of FIG. 3 optionally further includes operation 1010.

In operation 1010, the authenticator 240 corrects the image to verify whether the generated vein pattern matches a pre-stored vein pattern.

Referring to FIG. 10, operation 1010 includes operations 1012 and 1014.

In operation 1012, the method grayscales the image. For example, the authenticator 240 grayscales the image.

In operation 1014, the method corrects at least one of a scale, a point of view, and an orientation of the grayscaled image. For example, the authenticator 240 corrects at least one of a scale, a point of view, and an orientation of the grayscaled image.

Figure 11:
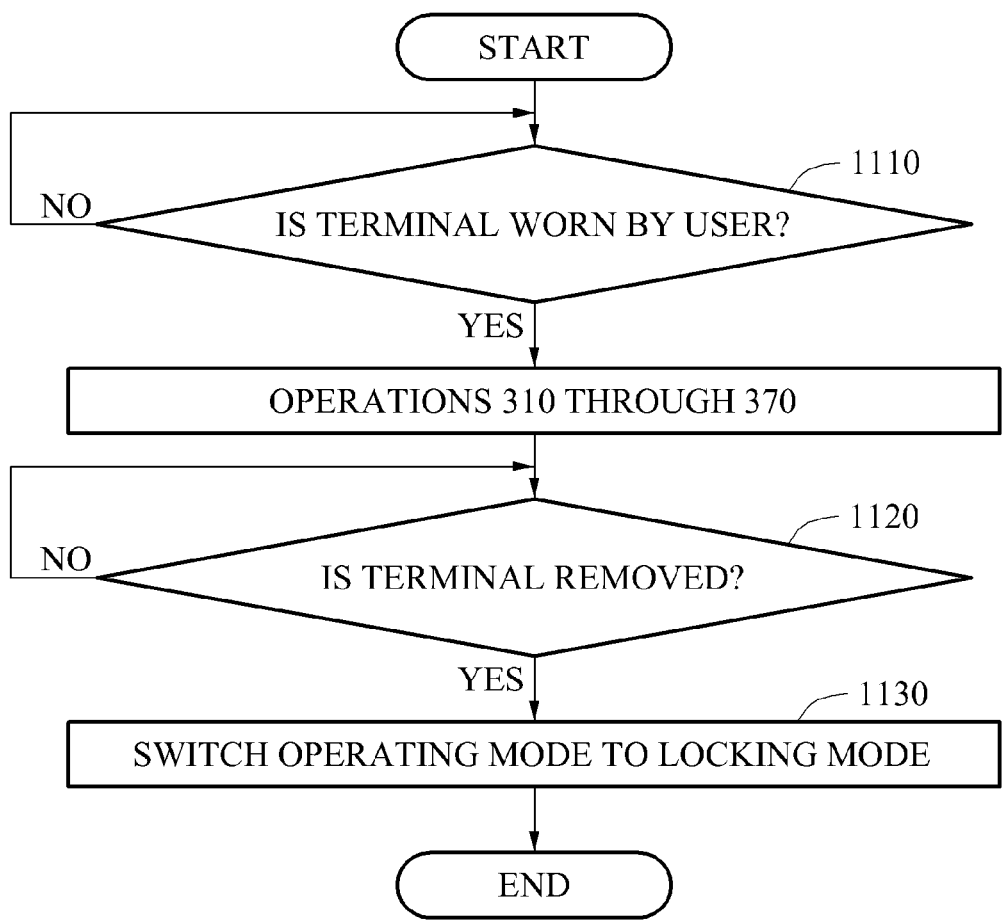
FIG. 11 is a flowchart illustrating an example of a method of switching an operating mode of a portable terminal to a locking mode.

FIG. 11 is a flowchart illustrating an example of a method of switching an operating mode of a portable terminal to a locking mode.

Referring to FIG. 11, in operation 1110, the method verifies whether the portable terminal 200 is worn by the user. For example, the controller 260 verifies whether the portable terminal 200 is worn by the user. For example, the controller 260 verifies whether the portable terminal 200 is worn by the user, using a sensor. In an example, when the portable terminal 200 is a watch type device, the sensor is included in a body part or a watchband of the portable terminal 200.

In another example, the controller 260 verifies whether the portable terminal 200 is worn by the user by verifying whether the portable terminal 200 is powered on.

Thus, in an example, when the portable terminal 200 is worn by the user, operations 310 through 370 are performed as discussed above to perform vein pattern authentication.

In the example of FIG. 11, after operation 370 is performed, operation 1120 is subsequently performed.

In operation 1120, the method verifies whether the portable terminal 200 is removed. For example, the controller 260 verifies whether the portable terminal 200 is removed.

When the portable terminal 200 is removed, operation 1130 is performed.

In operation 1130, the method switches an operating mode of the portable terminal 200 to a locking mode. For example, the controller 260 switches an operating mode of the portable terminal 200 to a locking mode.

Figure 12:
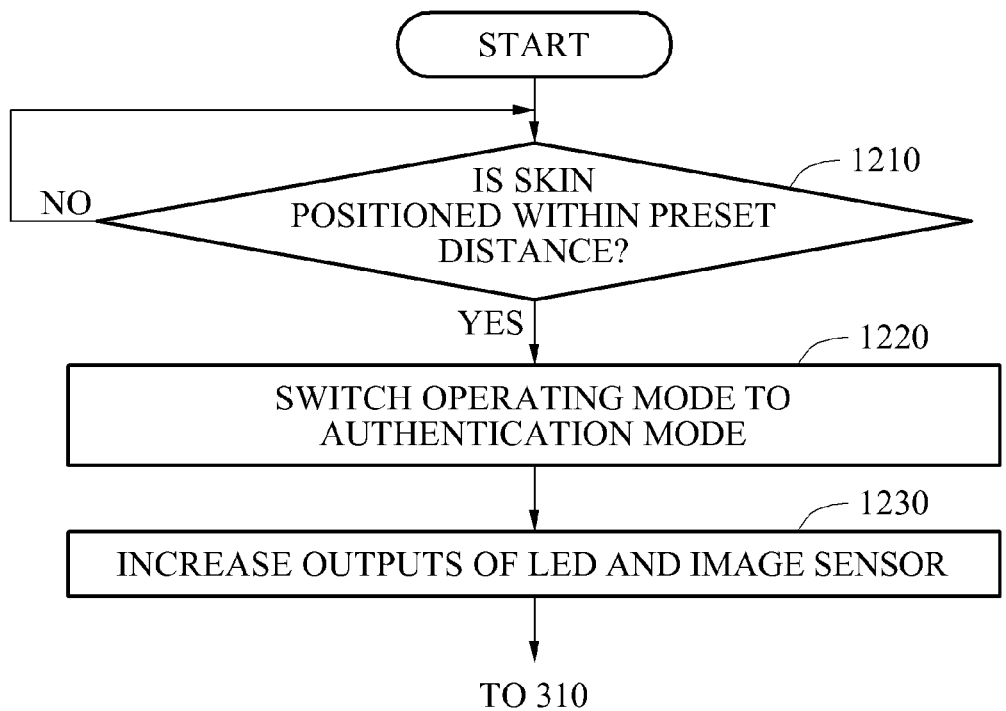
FIG. 12 is a flowchart illustrating an example of a method of switching an operating mode of a portable terminal to an authentication mode.

FIG. 12 is a flowchart illustrating an example of a method of switching an operating mode of a portable terminal to an authentication mode.

Operations 1210 through 1230 are optionally performed before operation 310 of FIG. 3 is performed.

Referring to FIG. 12, in operation 1210, the method verifies whether the skin is positioned within a preset distance from the portable terminal 200. For example, the controller 260 verifies whether the skin is positioned within a preset distance from the portable terminal 200.

For example, the controller 260 verifies whether the skin is positioned within the preset distance from the portable terminal 200, using an LED and an image sensor.

In operation 1220, the method switches an operating mode of the portable terminal 200 to an authentication mode when the skin is positioned within the preset distance from the portable terminal 200. For example, the controller switches an operating mode of the portable terminal 200 to an authentication mode when the skin is positioned within the preset distance from the portable terminal 200.

In operation 1230, the method increases outputs of the LED of the NIR ray projector 210 and the image sensor of the light receiver 220 to preset outputs. For example, the controller 260 increases outputs of the LED of the NIR ray projector 210 and the image sensor of the light receiver 220 to preset outputs.

For example, the controller 260 increases the outputs of the LED and the image sensor used for a general user interface (UI) to outputs for the authentication mode. The general UI is set to a mode to recognize a gesture of a user.

Since the outputs of the LED and the image sensor are increased only when the operating mode is switched to the authentication mode, a battery consumption of the portable terminal 200 is reduced.

After operation 1230 is performed, operation 310 of FIG. 3 is subsequently performed.

Figure 13:
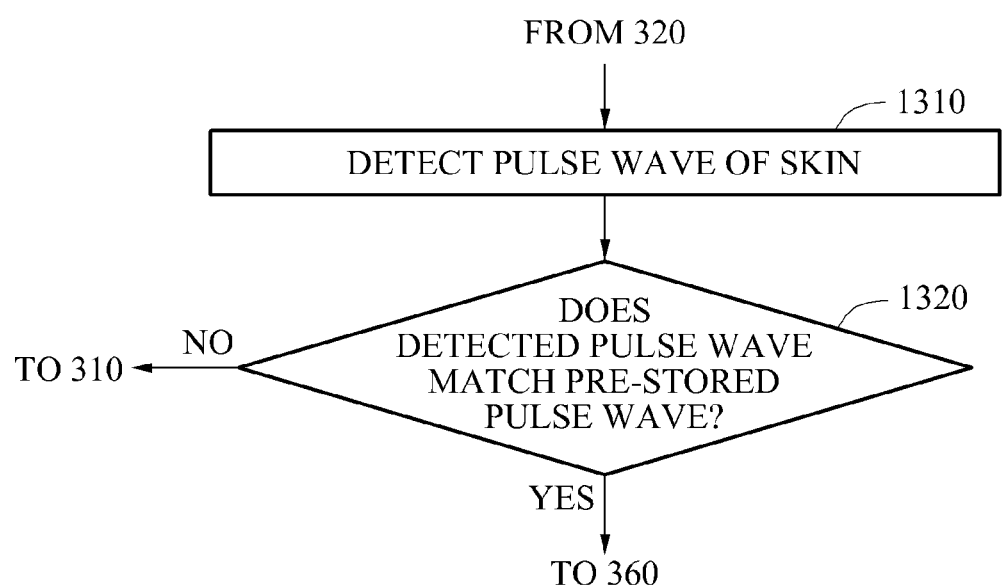
FIG. 13 is a flowchart illustrating an example of a method of detecting a pulse wave of a user.

FIG. 13 is a flowchart illustrating an example of a method of detecting a pulse wave of a user.

Operations 1310 and 1320 relate to a method of authenticating a user using a pulse wave of a vein of a skin.

Operations 1310 and 1320 are optionally performed after operation 320 of FIG. 3 is performed.

Referring to FIG. 13, in operation 1310, the method detects a pulse wave of a vein of a skin. For example, the authenticator 240 detects a pulse wave of a vein of a skin.

To detect the pulse wave, a change in the vein is sensed. For example, the authenticator 240 uses an image amplifier to sense a change in the vein. That is, the authenticator 240 uses the image amplifier to detect the pulse wave.

To detect the pulse wave, video data is required, rather than a single image. Here, video data includes a plurality of images that indicate changes over time. For example, the video data is obtained by iteratively performing operations 310 and 320.

The authenticator 240 detects the pulse wave of the vein of the skin using the video data. For example, the authenticator 240 use an extraction algorithm to detect the pulse wave based on the video data.

In operation 1320, the method verifies whether the detected pulse wave matches a pre-stored pulse wave. For example, the authenticator 240 verifies whether the detected pulse wave matches a pre-stored pulse wave.

In an example, the pre-stored pulse wave is a pulse wave detected from the user when the user is registered at the portable terminal 200.

When the detected pulse wave matches the pre-stored pulse wave, operation 360 of FIG. 3 is performed.

In an example, operations 1310 and 1320 are performed in parallel with operations 340 and 350 of FIG. 3.

Figure 14:
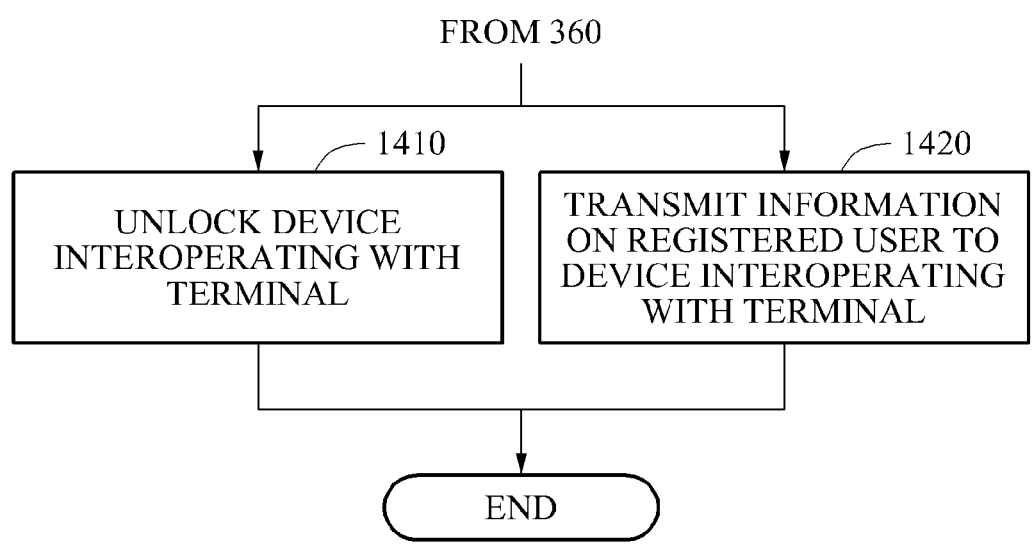
FIG. 14 is a flowchart illustrating an example of a method of unlocking a device interoperating with a portable terminal.

FIG. 14 is a flowchart illustrating an example of a method of unlocking a device interoperating with a portable terminal.

For example, operation 1410 or 1420 are optionally performed after operation 360 of FIG. 3 is performed.

Referring to FIG. 14, in operation 1410, the method unlocks a device interoperating with the portable terminal 200 when the user is authenticated as a registered user. For example, the controller 260 unlocks a device interoperating with the portable terminal 200 when the user is authenticated as a registered user. In an example, example, the controller 260 unlocks a smart phone interoperating with the portable terminal 200. In another example, the controller 260 unlocks an automobile interoperating with the portable terminal 200.

According to an example, when a user authentication is required to use a service, for example, financial transactions or payments, the portable terminal 200 authenticates a user and transmits authentication information to the service.

In operation 1420, the method transmits information on the registered user to the device interoperating with the portable terminal 200 when the user is authenticated as the registered user. For example, the controller 260 transmits information on the registered user to the device interoperating with the portable terminal 200 when the user is authenticated as the registered user.

According to an example, the device provides customized information for the registered user based on the received information related the registered user. For example, when the device is a television, the television provides contents preferred by the registered user based on the information related to the registered user.

Figure 15:
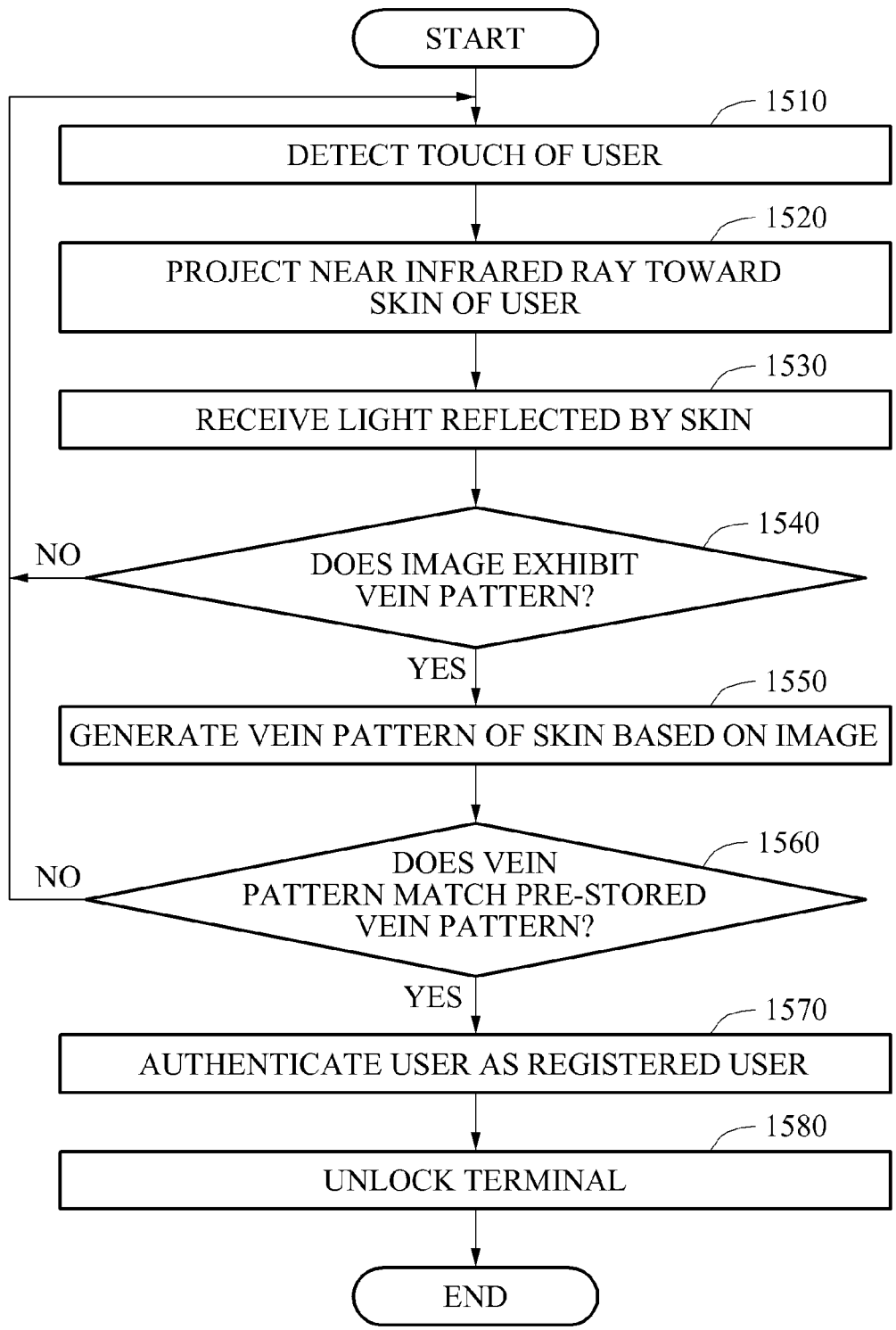
FIG. 15 is a flowchart illustrating an example of a vein pattern authentication method.

FIG. 15 is a flowchart illustrating an example of a vein pattern authentication method. For example, the vein pattern authentication method of FIG. 15 is performed by the portable terminal 200 of FIG. 2.

Referring to FIG. 15, in operation 1510, the method detects a touch of a user with respect to the portable terminal 200. For example, the controller 260 detects a touch of a user with respect to the portable terminal 200.

In operation 1520, the method projects an NIR ray toward a touched skin of the user using an LED. For example, the NIR ray projector 210 projects an NIR ray toward a touched skin of the user using an LED.

The descriptions of operation 310 of FIG. 3 are applicable to operation 1520, with respect to aspects of projecting light.

In operation 1530, the method receives a light reflected by the skin using an image sensor. For example, the light receiver 220 receives a light reflected by the skin using an image sensor. The light receiver 220 generates an image using the received light.

The descriptions of operation 320 of FIG. 3 are applicable to operation 1530, with respect to aspects of receiving the reflected light.

In operation 1540, the method verifies whether the image exhibits a vein pattern. For example, the vein pattern generator 230 verifies whether the image exhibits a vein pattern.

The descriptions of operation 330 of FIG. 3 are applicable to operation 1540 with respect to aspects of verifying.

In operation 1550, the method generates a vein pattern of the skin based on the image generated using the received light. For example, vein pattern generator 230 generates a vein pattern of the skin based on the image generated using the received light.

In operation 1560, the method verifies whether the generated vain pattern matches a pre-stored vein pattern. For example, the authenticator 240 verifies whether the generated vain pattern matches a pre-stored vein pattern.

The descriptions of operation 350 of FIG. 3 are applicable to operation 1560, with respect to aspects of considering matches.

In operation 1570, the method authenticates the user as a registered user of the pre-stored vein pattern when the generated vein pattern matches the pre-stored vein pattern. For example, the authenticator 240 authenticates the user as a registered user of the pre-stored vein pattern when the generated vein pattern matches the pre-stored vein pattern.

The descriptions of operation 360 of FIG. 3 are applicable to operation 1570 with respect to authentication.

In operation 1580, the method unlocks the portable terminal 200 when the user is authenticated as the registered user. For example, the controller 260 unlocks the portable terminal 200 when the user is authenticated as the registered user.

The descriptions of operation 370 of FIG. 3 are applicable to operation 1580, with respect to unlocking the portable terminal 200.

Figure 16:
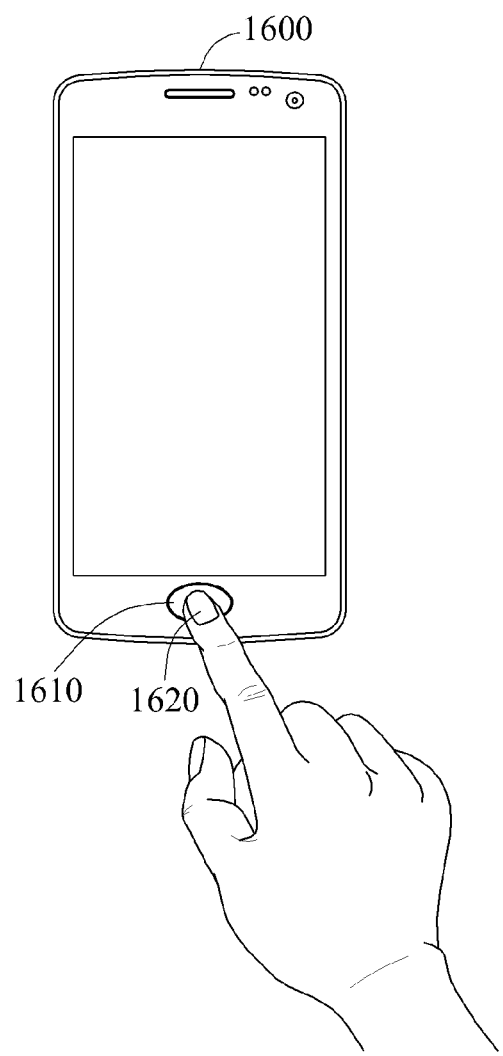
FIG. 16 illustrates an example of a portable terminal authenticating a vein pattern using a touch of a user.

FIG. 16 illustrates an example of a portable terminal 1600 authenticating a vein pattern using a touch of a user.

In the example of FIG. 16, the portable terminal 1600 corresponds to the portable terminal 200 of FIG. 2.

According to various examples, the portable terminal 1600 is a smart phone, a laptop computer, or a tablet PC. However, these are only examples, and the portable terminal 1600 is not limited to these examples. In other examples, the portable terminal 1600 consists of another portable electronic device.

According to another example, the portable terminal 1600 is a wearable device. For example, in such an example, the portable terminal is a smartwatch, electronic ring, or electronic glasses.

Referring to FIG. 16, a user attempts a vein authentication by touching a touch portion 1610 of the portable terminal 1600 with a skin 1620 of the user.

In an example, the touch portion 1610 is of a physical button type. In another example, the touch portion 1610 is a soft key. Thus, the touch portion 1610 is an area of the portable terminal 1600 that activates when touched.

The controller 260 of FIG. 2 detects the touch of the user using the touch portion 1610.

Although FIG. 16 illustrates the portable terminal 1600 as corresponding to a smart phone, including the touch portion 1610 in a wearable device is featured in another example.

For example, the touch portion 610 is included in a watch type wearable device. Again, the touch portion 1610, in examples, is a physical butter or a soft key, or another area of the portable terminal 1600 that activates when touched.

Figure 17:
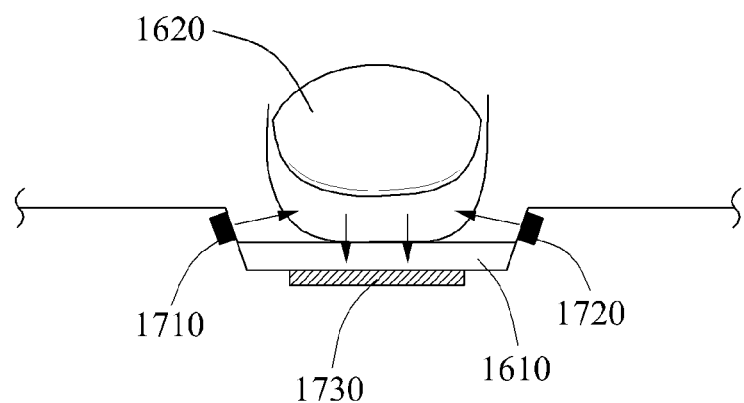
FIG. 17 illustrates an example of a method of projecting an NIR ray toward a skin.

FIG. 17 illustrates an example of a method of projecting an NIR ray toward a skin.

Referring to FIG. 17, the portable terminal 1600 of FIG. 16 includes NIR ray projectors 1710 and 1720, and a light receiver 1730. In the example of FIG. 17, the NIR ray projectors 1710 and 1720, and the light receiver 1730 correspond to the NIR ray projector 210, and the light receiver 220 of FIG. 2, respectively. Descriptions of the NIR ray projectors 1710 and 1720, and the light receiver 1730 correspond to the descriptions of the NIR ray projector 210 and the light receiver 220, respectively, and hence are not repeated for brevity.

For example, the NIR ray projectors 1710 and 1720 include a plurality of LEDs.

In such an example, the NIR ray projectors 1710 and 1720 project NIR rays toward the skin 1620 of the user. For example, the skin 1620 of the user may be a finger of the user.

In this example, the light receiver 1730 receives lights reflected by the finger 1620.

Although FIG. 17 illustrates the touch portion 1610 provided in a form of a flat surface, in another example the touch portion 1610 is provided in a form of a curved surface. When the touch portion 1610 is provided in a form of a curved surface, the touch portion 1610 is disposed between the finger 1610 and the NIR ray projectors 1710 and 1720.

Technical descriptions provided for each figure also pertain to subsequent figures, and hence duplicated descriptions are omitted for brevity.

The apparatuses, units, modules, devices, and other components illustrated in FIGS. 1-17 that perform the operations described herein with respect to FIGS. 1-17 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-17. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-17 that perform the operations described herein with respect to FIGS. 1-17 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of authenticating a user using a vein pattern, the method comprising:
   verifying whether a skin of the user is positioned less than a preset distance from a terminal;
   switching an operating mode of the terminal to an authentication mode, dependent on a result of the verifying;
   increasing outputs of a light emitting diode (LED) and an image sensor to preset outputs in response to the operating mode being switched to the authentication mode;
   projecting a near infrared (NIR) ray toward the skin of the user, using the LED, wherein the user is adjacent to a terminal comprising the LED;
   receiving a light reflected by the skin using the image sensor;
   verifying whether an image generated using the received light exhibits a vein pattern;
   in response to the image generated using the received light exhibiting a vein pattern, generating a vein pattern of the skin based on the image generated using the received light; and
   authenticating the user as a registered user corresponding to a pre-stored vein pattern when the generated vein pattern matches the pre-stored vein pattern.

2. The method of claim 1, further comprising:
   verifying whether the generated vein pattern matches the pre-stored vein pattern.

3. The method of claim 1, wherein the terminal is a wearable device.

4. The method of claim 1, further comprising:
   controlling the projecting of the NIR ray by increasing an integration time when an output of the LED is determined to be lower than a preset output.

5. The method of claim 1, further comprising:
   unlocking the terminal in response to the user being authenticated as the registered user.

6. The method of claim 1, further comprising:
   unlocking a device interoperating with the terminal in response to the user being authenticated as the registered user.

7. The method of claim 1, wherein the switching of the operating mode of the terminal to the authentication mode is performed upon the skin being determined to be positioned less than the preset distance from the terminal.

8. The method of claim 1, further comprising:
   detecting a pulse wave of a vein of the skin using the received light; and
   verifying whether the detected pulse wave matches a pre-stored pulse wave,
   wherein the authenticating comprises authenticating the user as the registered user in response to the generated vein pattern matching the pre-stored vein pattern and in response to the detected pulse wave matching the pre-stored pulse wave.

9. The method of claim 8, wherein the detecting comprises detecting the pulse wave using an image amplifier.

10. The method of claim 1, wherein the image sensor comprises one of a complementary metal-oxide semiconductor (CMOS) image sensor (CIS), a charge coupled device (CCD), a laser speckle sensor, and a sensor using indium-gallium-sulfur (InGaS).

11. The method of claim 1, further comprising:
    registering the registered user at the terminal.

12. The method of claim 11, wherein the registering comprises:
    projecting an NIR ray toward a skin of the registered user adjacent to the terminal, using the LED;
    receiving a light reflected by the skin of the registered user using the image sensor;
    generating a vein pattern of the skin of the registered user based on an image generated using the received light; and
    registering the registered user at the terminal by storing the vein pattern.

13. The method of claim 1, wherein the authenticating comprises correcting the image to verify whether the generated vein pattern matches the pre-stored vein pattern.

14. The method of claim 13, wherein the correcting comprises:
    grayscaling the image; and
    correcting at least one of a scale, a point of view, and an orientation of the grayscaled image.

15. The method of claim 1, further comprising:
verifying whether the terminal is worn by the user when the terminal is a wearable device,
wherein the projecting is performed in response to the terminal being worn by the user.

16. The method of claim 15, further comprising:
verifying whether the terminal is removed; and
switching an operating mode of the terminal to a locking mode in response to the terminal being removed.

17. The method of claim 1, further comprising:
transmitting information corresponding to the registered user to a device interoperating with the terminal when the user is authenticated as the registered user.

18. A terminal comprising:
one or more processors configured to:
verify whether a skin of the user is positioned less than a preset distance from a terminal;
switch an operating mode of the terminal to an authentication mode, dependent on a result of the verifying;
increase outputs of a light emitting diode (LED) and an image sensor to preset outputs in response to the operating mode being switched to the authentication mode;
project a near infrared (NIR) ray toward a skin of a user of the terminal using the LED, wherein the user is adjacent to the terminal comprising the LED;
receive a light reflected by the skin using the image sensor;
verify whether an image generated using the received light exhibits a vein pattern;
in response to the image generated using the received light exhibiting a vein pattern, generate a vein pattern of the skin based on the image generated using the received light; and
authenticate the user as a registered user corresponding to a pre-stored vein pattern when the generated vein pattern matches the pre-stored vein pattern.

19. A method of authenticating a user using a vein pattern performed by a terminal, the method comprising:
verifying whether a skin of the user is positioned less than a preset distance from a terminal;
switching an operating mode of the terminal to an authentication mode, dependent on a result of the verifying;
increasing outputs of a light emitting diode (LED) and an image sensor to preset outputs in response to the operating mode being switched to the authentication mode;
projecting a near infrared (NIR) ray toward a touched skin of the user using the LED;
receiving a light reflected by the skin using the image sensor;
verifying whether an image generated using the received light exhibits a vein pattern;
in response to the image generated using the received light exhibiting a vein pattern, generating a vein pattern of the skin based on the image generated using the received light; and
authenticating the user as a registered user corresponding to a pre-stored vein pattern when the generated vein pattern matches the pre-stored vein pattern.

20. The method of claim 19, further comprising:
verifying whether the generated vein pattern matches the pre-stored vein pattern.

21. The method of claim 19, wherein the terminal is a wearable device.

22. The method of claim 19, further comprising:
controlling the projecting of the NIR ray by increasing an integration time when an output of the LED is determined to be lower than a preset output.

23. The method of claim 19, further comprising:
unlocking the terminal in response to the user being authenticated as the registered user.

24. The method of claim 19, further comprising:
unlocking a device interoperating with the terminal in response to the user being authenticated as the registered user.

25. The method of claim 19, further comprising:
detecting a pulse wave of a vein of the skin using the received light; and
verifying whether the detected pulse wave matches a pre-stored pulse wave,
wherein the authenticating comprises authenticating the user as the registered user in response to the generated vein pattern matching the pre-stored vein pattern and in response to the detected pulse wave matching the pre-stored pulse wave.

26. The method of claim 25, wherein the detecting comprises detecting the pulse wave using an image amplifier.

27. The method of claim 19, wherein the image sensor comprises one of a complementary metal-oxide semiconductor (CMOS) image sensor (CIS), a charge coupled device (CCD), a laser speckle sensor, and a sensor using indium-gallium-sulfur (InGaS).

28. The method of claim 19, further comprising:
registering the registered user at the terminal.

29. The method of claim 28, wherein the registering comprises:
recognizing a touch of the registered user;
projecting an NIR ray toward a touched skin of the registered user using the LED;
receiving a light reflected by the skin of the registered user using the image sensor;
generating a vein pattern of the skin of the registered user using the received light; and
registering the registered user at the terminal by storing the vein pattern.

30. The method of claim 19, wherein the authenticating comprises correcting the image to verify whether the generated vein pattern matches the pre-stored vein pattern.

31. The method of claim 30, wherein the correcting comprises:
grayscaling the image; and
correcting at least one of a scale, a point of view, and an orientation of the grayscaled image.

32. The method of claim 19, further comprising:
verifying whether the terminal is worn by the user in response to the terminal being a wearable device,
wherein the projecting is performed in response to the terminal being worn by the user.

33. The method of claim 32, further comprising:
verifying whether the terminal is removed; and
switching an operating mode of the terminal to a locking mode in response to the terminal being removed.

34. The method of claim 19, further comprising:
transmitting information corresponding to the registered user to a device interoperating with the terminal when the user is authenticated as the registered user.

35. A terminal comprising:
one or more processors configured to:
verify whether a skin of a user is positioned on the terminal;

switch an operating mode of the terminal to an authentication mode upon the verifying of the skin of the user being positioned on the terminal;
increase outputs of a light emitting diode (LED) and an image sensor to preset outputs in response to the operating mode being switched to the authentication mode;
project a near infrared (NIR) ray toward a touched skin of the user using the LED;
receive a light reflected by the skin using the image sensor;
verify whether an image generated using the received light exhibits a vein pattern;
in response to the image generated using the received light exhibiting a vein pattern, generate a vein pattern of the skin based on the image generated using the received light; and
authenticate the user as a registered user corresponding to a pre-stored vein pattern when the generated vein pattern matches the pre-stored vein pattern.

36. A method of authenticating a user using a vein pattern, the method comprising:
automatically, in response to a verification that a skin of the user is positioned less than a preset distance from a terminal, switching an operating mode of the terminal to an authentication mode;
increasing outputs of a light emitting diode (LED) and an image sensor to preset outputs in response to the operating mode being switched to the authentication mode;
projecting a near infrared (NIR) ray toward the skin of the user using the LED;
receiving a light reflected by the skin using the image sensor;
verifying whether an image generated using the received light exhibits a vein pattern;
in response to the image generated using the received light exhibiting a vein pattern, generating a vein pattern of the skin based on the image generated using the received light; and
authenticating the user as a registered user based on the generated vein pattern and a pre-stored vein pattern.

37. The method of claim 36, wherein the authenticating comprises authenticating the user as a registered user corresponding to the pre-stored vein pattern when the generated vein pattern matches the pre-stored vein pattern.

38. The method of claim 36, further comprising:
performing the verification that the skin of the user is positioned less than the preset distance from the terminal.

* * * * *